US008800788B1

(12) United States Patent
Guidry

(10) Patent No.: US 8,800,788 B1
(45) Date of Patent: Aug. 12, 2014

(54) TRANSPORTABLE FISHING ROD HOLDER

(76) Inventor: Lance D. Guidry, Orange, TX (US)

( * ) Notice: Subject to any disclaimer, the term of this patent is extended or adjusted under 35 U.S.C. 154(b) by 237 days.

(21) Appl. No.: 13/353,747

(22) Filed: Jan. 19, 2012

(51) Int. Cl.
  *A47F 7/00*   (2006.01)
  *A01K 97/10*  (2006.01)
  *B60R 7/08*   (2006.01)

(52) U.S. Cl.
  CPC . *A01K 97/10* (2013.01); *B60R 7/08* (2013.01); *Y10S 224/922* (2013.01)
  USPC .......................................... 211/70.8; 224/922

(58) Field of Classification Search
  CPC ....... A01K 97/08; A01K 97/10; A01K 97/11; B60R 7/08; A47B 81/005
  USPC .............. 211/70.8, 60.1, 64, 65, 67, 68, 70.2, 211/70.5; 224/922; 43/21.2, 25; 248/230.7, 248/351, 500–503.1, 74.1, 74.2
  See application file for complete search history.

(56) References Cited

U.S. PATENT DOCUMENTS

| | | | | |
|---|---|---|---|---|
| 2,539,783 | A * | 1/1951 | Kirk, Jr ............................ | 248/62 |
| 2,854,147 | A * | 9/1958 | Derr ............................ | 211/70.8 |
| 3,291,427 | A | 12/1966 | Hutchings | |
| 3,487,947 | A | 1/1970 | Bogar, Jr. | |
| 4,157,804 | A | 6/1979 | Byford | |
| D272,658 | S * | 2/1984 | Schoenig ..................... | D26/138 |
| 4,555,083 | A * | 11/1985 | Carter ........................... | 248/313 |
| 4,696,122 | A | 9/1987 | Van Der Zyl | |
| 4,779,914 | A | 10/1988 | Friedline | |
| D300,283 | S | 3/1989 | Duckro, Jr. et al. | |
| 4,927,103 | A * | 5/1990 | Nicholson ....................... | 248/62 |
| 5,014,458 | A * | 5/1991 | Wagner ......................... | 43/21.2 |
| 5,137,319 | A * | 8/1992 | Sauder .......................... | 294/159 |
| 5,487,475 | A * | 1/1996 | Knee ............................ | 211/70.8 |
| 5,685,107 | A * | 11/1997 | Sweet ........................... | 43/21.2 |
| 5,842,615 | A * | 12/1998 | Goodness ..................... | 224/509 |
| 5,957,419 | A * | 9/1999 | Lancaster et al. ........... | 248/188.1 |
| 5,979,102 | A | 11/1999 | Sagryn | |
| D446,280 | S * | 8/2001 | Marriott ....................... | D22/147 |
| 6,345,750 | B1 * | 2/2002 | McCoy et al. ................ | 224/525 |
| 6,517,134 | B2 * | 2/2003 | Armstrong ....................... | 296/3 |
| 8,430,286 | B1 * | 4/2013 | Patrick .......................... | 224/401 |

* cited by examiner

*Primary Examiner* — Korie H Chan
(74) *Attorney, Agent, or Firm* — Robert C. Montgomery; Montgomery Patent & Design

(57) ABSTRACT

A transportable fishing pole holder holds, transports, and stores multiple fishing poles and includes a frame having cylindrical members made of a durable, weatherproof material. A lower member includes a plurality of receiving apertures which accept the butt of a fishing pole. The upper member includes a corresponding plurality of upper apertures, with each aperture having a foam interior to retain a rod segment of the fishing pole. A user slides a fishing pole out of the upper aperture and lifts it upwardly out of the lower member for use. The frame is removably attachable to a plurality of clip mounts which are installed along a support surface of a structure. This allows the entire frame, along with the fishing rods, to be removed and transported after use.

15 Claims, 5 Drawing Sheets

TRANSPORTABLE FISHING ROD HOLDER

RELATED APPLICATIONS

Not Applicable.

FIELD OF THE INVENTION

The present invention relates generally to fishing pole racks, and in particular, to a transportable fishing pole holder for safely transporting a plurality of fishing poles and securely retaining the poles upon reaching a destination.

BACKGROUND OF THE INVENTION

A great number of people around the world enjoy fishing. Whether fishing for food or for the sport of it, the calmness and serenity of the sport, coupled with the excitement of landing "the big one" makes fishing a popular pastime. However, as with equipment for any sport, one quickly accumulates a wide variety of fishing rods. Additionally, with many fishermen or a family including children, it would not be uncommon to have up to a half dozen different fishing poles. All of these must be transported back and forth from a home, to a motor vehicle, and then to a boat, then back again at the end of the fishing trip. All of this transportation presents ample opportunities for a rod to become broken or the line to become tangled together with other rods.

While various fishing rod racks are known, there remain problems with providing a storage rack that is easily transportable as well as easily and quickly securable once a destination or area of use is reached, such as a boat.

SUMMARY OF THE INVENTION

The inventor has recognized the aforementioned inherent problems and lack in the art and observed that there is a need for a holding device for securely storing and transporting multiple fishing rods in a manner which prevents damage, breakage, tangling, and other undesired situations.

Accordingly, it is an object of the present embodiments of the invention to solve at least one (1) of these problems. The inventor has addressed this need by developing a transportable fishing rod holder that provides for the storage and transport of multiple fishing rods in a manner which is quick, easy, and effective. The inventor has thus realized the advantages and benefits of providing the transportable fishing pole holder. The holder includes a vertical member having an upper end and a lower end, a lower horizontal member affixed to the vertical member lower end, and an upper horizontal member affixed to the vertical member upper end parallel to the lower horizontal member. At least two (2) base clamps are fastenable to a horizontal support surface and are connected to the lower horizontal member. A center brace is fastenable to a vertical support surface and is connected to the vertical member. A plurality of receiving apertures is disposed longitudinally along a top surface of the lower horizontal member. Each of the receiving apertures is adapted to receive a butt grip end of the fishing pole. A plurality of upper apertures is disposed longitudinally along a front surface of the upper horizontal member. Each of the upper apertures is adapted to receive a rod segment of the fishing pole. The plurality of receiving apertures and upper apertures are spaced apart at intervals for holding a plurality of fishing poles parallel to each other in a side-by-side orientation and extending between the lower horizontal member and the upper horizontal member.

In certain embodiments the upper horizontal member includes a foam core. An area of the foam core is exposed within each of the upper apertures and includes a vertical slit for holding the rod segment of the fishing pole.

In certain embodiments the transportable fishing pole holder also includes a pair of securing cords. Each of the cords includes a length of cord and hook fastener at each end which is attachable to the upper horizontal member for retaining the fishing poles within the upper apertures. The upper horizontal member also includes a plurality of outwardly protruding securing pins spaced apart at intervals along a rear surface alternatingly positioned relative to the upper apertures. The hook fasteners of the securing cord are attachable between an outside pair of securing pins and the length of cord is looped between the plurality of fishing poles and an interior plurality of securing pins.

The invention, unlike previous attempts provides an apparatus which holds a plurality of fishing poles for transportation to and from utilized location and which provides for an easy and quick method of securing the holder to a boat or other support surface.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

Figure 1:
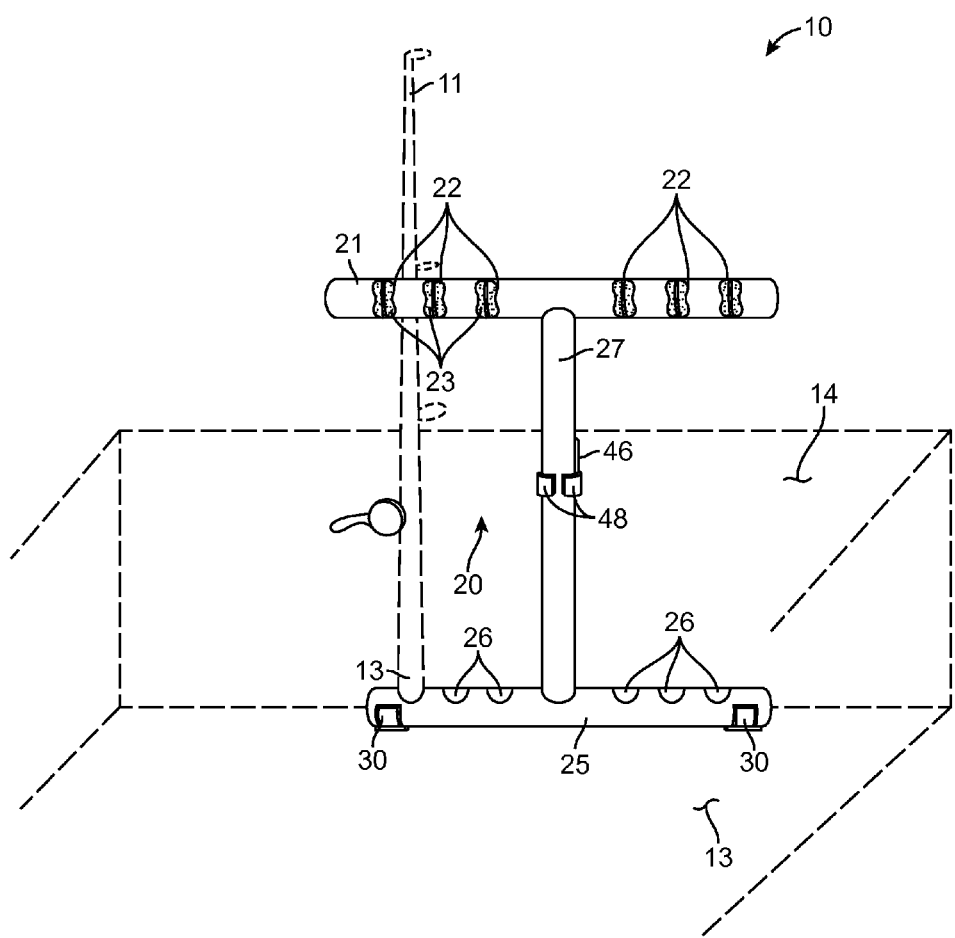
FIG. 1 is an environmental view of a transportable fishing rod holder in accordance with the present invention.

| | |
|---|---|
| 10 | transportable fishing rod holder |
| 11 | fishing rod |
| 12 | rod butt |
| 13 | horizontal surface |
| 14 | vertical surface |
| 20 | transportable member |
| 21 | upper horizontal member |
| 22 | upper aperture |
| 23 | foam |
| 24 | receiving slit |
| 25 | lower horizontal member |
| 26 | receiving aperture |
| 27 | vertical member |
| 30 | base clamp |
| 31 | base |
| 32 | base aperture |

| | |
|---|---|
| 33 | fastener |
| 34 | receiving opening |
| 35 | receiving space |
| 40 | center brace |
| 41 | flange |
| 42 | flange base |
| 43 | flange fastening aperture |
| 44 | flange receiving opening |
| 45 | flange receiving opening aperture |
| 46 | arm |
| 47 | arm aperture |
| 48 | arm clamp |
| 49 | arm clamp receiving opening |
| 50 | arm clamp receiving space |
| 51 | detent pin |
| 60 | securing pin |
| 61 | securing cord |
| 62 | hook |

DETAILED DESCRIPTION OF THE PREFERRED EMBODIMENT

In accordance with the invention, the best mode is presented in terms of a preferred embodiment, herein depicted within FIGS. 1 through 6. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 6, depicting a transportable fishing rod holder (herein described as an "apparatus") 10, where like reference numerals represent similar or like parts. In accordance with the invention, the present disclosure describes the apparatus 10 for providing a means for securely storing and transporting a plurality of fishing rods 11. The apparatus 10 maintains the fishing rods 11 in a generally vertical orientation and correspondingly eliminates tangling or damages to the fishing rods 11 during transport.

Figure 2:
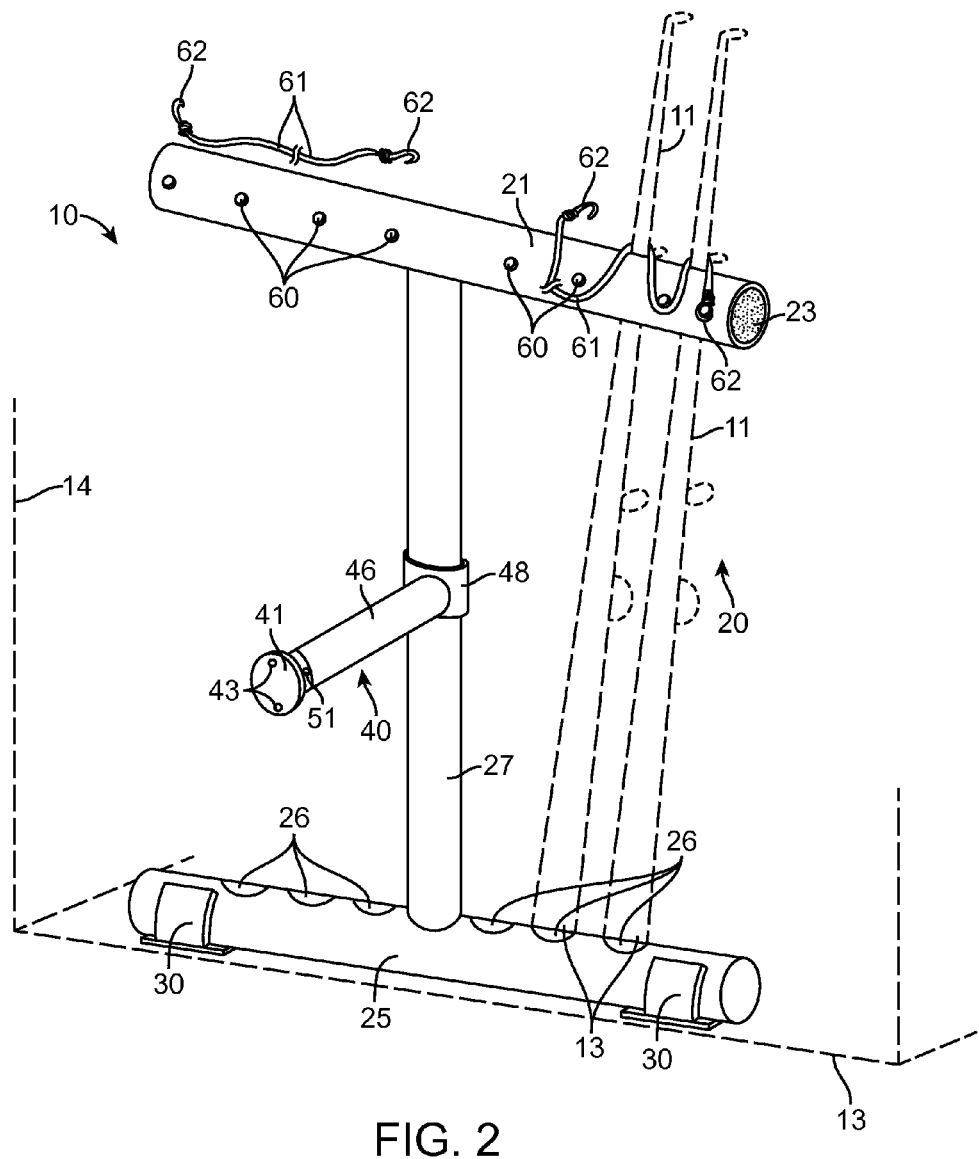
FIG. 2 is a rear view of the transportable fishing rod holder.

FIG. 1 shows an environmental view of the apparatus 10 and FIG. 2 shows a rear view of the apparatus 10. The apparatus 10 is mountable between a generally horizontal surface 13 and vertical surface 14, typically in association with a boat, a truck bed, or similar transportation vehicles. The apparatus 10 includes a removably attachable transportable member 20, a pair of base clamps 30, and a center brace 40. The apparatus 10 is fabricated in various sizes to accommodate various pluralities of fishing rods 11.

Figure 3:
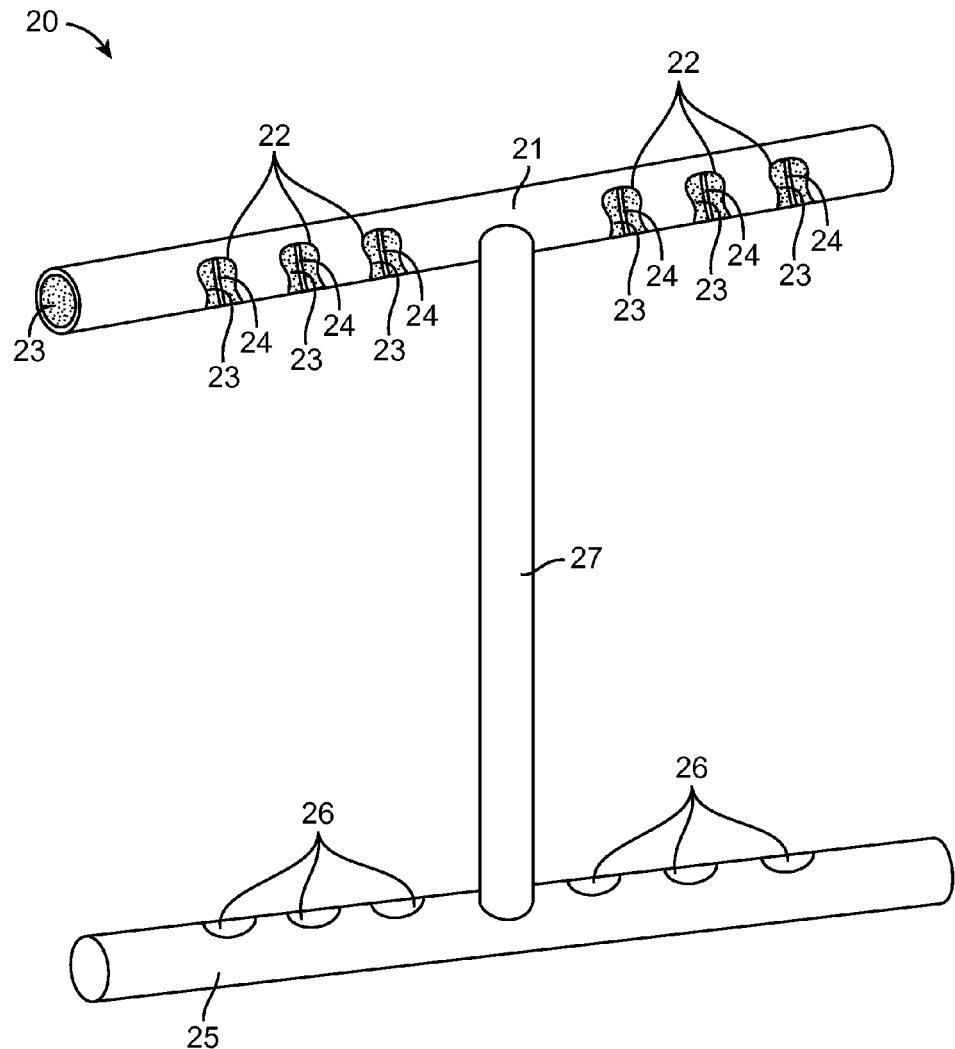
FIG. 3 is a front perspective of a transportable member of the transportable fishing rod holder.

FIG. 3 shows a front perspective view of the transportable member 20. The transportable member 20 generally forms an "I" shape which is removably attached at a selected position and location for retaining the fishing rods 11. The transportable member 20 is fabricated from durable weather-proof materials, such as polyvinyl chloride (PVC) or the similar thermoplastic material.

The "I" shape of the transportable member 20 includes an upper horizontal member 21, a lower horizontal member 25, and a vertical member 27. The upper horizontal member 21 is a tubular structure measuring approximately two (2) feet in width and filled with foam 23. The foam 23 is preferably in a solid rod form, yet other forms such as spray foam can be utilized without limiting the scope of the apparatus 10. The foam 23 is utilized to secure the fishing rods 11. The foam 23 is exposed through a plurality of upper apertures 22 disposed upon a front facing surface of the upper horizontal member 21. The upper apertures 22 are spaced apart at intervals longitudinally along the upper horizontal member 21 and provide an ample surface opening for accessing the areas of exposed foam 23. A single fishing rod 11 can be fittingly engaged and at least partially secured within the foam 23. The exposed areas of foam 23 also include a vertical receiving slit 24 intermediately positioned within the upper aperture 22. An upper portion of the fishing rod 11 can be at least partially inserted within the receiving slot 24 to retain and secure the upper portion of the fishing rod 11 in a generally vertical orientation. The receiving slit 24 is preferably pre-cut into the foam 23 during manufacturing.

The vertical member 27 is also a tubular structure which interconnects the upper horizontal member 21 to the lower horizontal member 25. The vertical member 27 measures approximately two-and-a-half (2½) feet in length. A distal end of the vertical member 27 is affixed to an underside central exterior surface of the upper horizontal member 21. The opposing proximal end of the vertical member 27 is affixed to an upper central exterior surface of the lower horizontal member 25 which is parallel to the upper horizontal member 21. The vertical member 27 separates the horizontal members 21, 25 an appropriate distance apart to properly receive at least a rod butt 12 to be inserted within a desired receiving aperture 26 upon the lower horizontal rod 25 with an upper portion of the fishing rod 11 within the respective foam 23 exposed from the upper aperture 22. Each receiving aperture 26 is positioned upon an upper surface of the lower horizontal member 25 and is an appropriate diameter to retain the rod butt 12 of various types of fishing rods 11.

A plurality of receiving apertures 26 is disposed longitudinally along the lower horizontal member 25. The receiving apertures 26 align with respective upper apertures 22 to position each fishing rod 11 in the generally vertical orientation. The rod butt 12 is insertingly positioned within a selected one (1) of the receiving apertures 26 and the upper portion of the fishing rod 11 is secured within the respective receiving slit 24.

The upper horizontal member 21 includes a plurality of securing pins 60 which protrude outwardly from a rear surface for winding or wrapping a securing cord 61 around to secure the fishing rods 11 in place during transit. The securing pins 60 can be fastened or adhered to the exterior surface of the upper horizontal member 21. The securing cord 61 is an elastic cord having a hook 62 on each opposing end. The hooks 62 of the securing cord 61 connectively engage two (2) of the securing pins 60 for fastening purposes. The interior length of the securing cord 61 is wrapped around a front surface of the fishing rod 11 and routed back to a rear surface of the upper horizontal member 21 and under a securing pin 60. This is repeated a desired amount of times as needed dependant on the number of fishing rods 11 being transported or secured. The securing cord 61 can also be a length of non-elastic martial, such as rope, also having connector fasteners on opposing ends.

Figure 4:
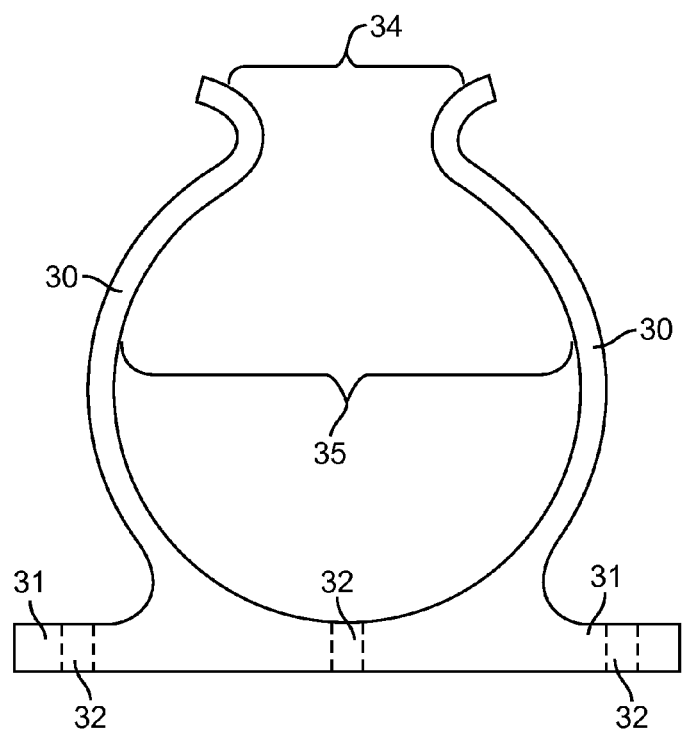
FIG. 4 is a front view of a base clamp of the transportable fishing rod holder.
Figure 5:
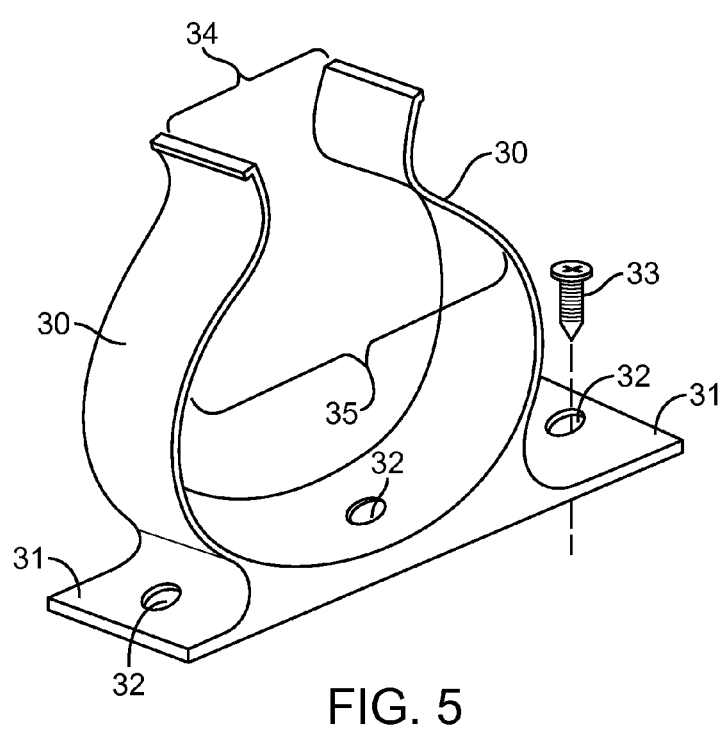
FIG. 5 is a perspective view of the base clamp.

FIG. 4 shows a front view of a base clamp 30 and FIG. 5 shows a perspective view of the base clamp 30. The lower horizontal member 25 is removably connected to the horizontal support surface 13 by at lease a pair of "C"-shaped base clamps 30. Each base clamp 30 is a flexible plastic member having a receiving opening 34 to receive and at least partially accept an exterior surface of each end of the lower horizontal member 25 within a receiving space 35 defined by the interior of the clamp 30. The base clamps 30 also include a rectangular base 31 having a plurality of base apertures 32. The base apertures 32 receive mechanical fasteners 33, such as screws, to fasten the base clamp 30 to the horizontal surface 13. An upper inward bend at the end of each flexible arm of the base clamp 30 allows for easier insertion of the lower horizontal member 25 and limits unintentional removal.

Figure 6:
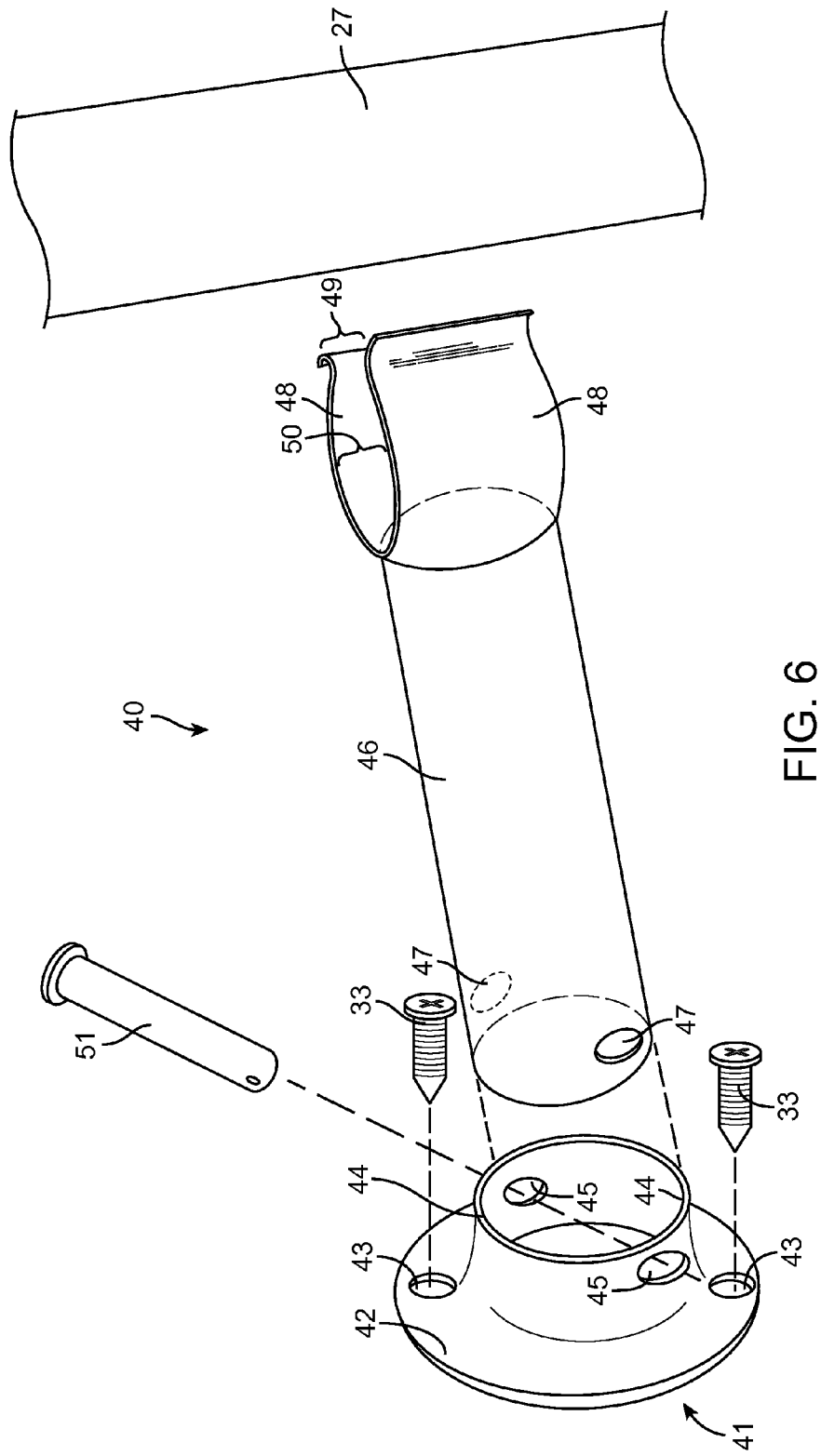
FIG. 6 is a perspective view of a center brace of the transportable fishing rod holder.

FIG. 6 shows a perspective view of a center brace 40 which is used to secure the transportable member 20 to the vertical support surface 14. The center brace 40 includes a flange 41, an arm 46, and an arm clamp 48; which are all fabricated from PVC or a similar durable and weather-proof material. The flange 41 is attached to the vertical surface 14 and perpendicularly receives an end of the arm 46. The flange 41 is a circular flange base 42 having an intermediately protruding flange receiving opening 44. The flange base 42 includes a pair of flange fastening apertures 43 to receive a pair of fasteners 33 for fastening to the vertical surface 14. The flange receiving opening 44 receives a distal end of the arm 46. A pair of arm apertures 47 disposed on the distal end of the arm 46 is aligned with a pair of flange receiving opening apertures 45 disposed on the flange receiving opening 44. The arm 46 is secured to the flange 42 by inserting a detent pin 51 through the aligned pairs of apertures 45, 47.

The arm 46 is another tubular structure used to attach the transportable member 20, via connection to the vertical member 27, to the vertical surface 14. The base clamps 30 are fastened to the horizontal surface 13 below the end of the arm 46 in order to position and align the transportable member in an upright orientation. The diameter of the arm 46 is slightly smaller than an inner diameter of the flange receiving opening 44 to enable placement therewithin. The proximal end of the arm 46 includes an arm clamp 48 which secures the center brace 40 to an exterior surface of the vertical member 27. The arm clamp 48 functions in a similar manner to the base clamps 30. The arm clamp 48 includes an arm clamp receiving opening 49 which receives the vertical member 27 which is inserted within an arm clamp receiving space 50 to hold the vertical member 27 in an upright position.

It can be appreciated by one skilled in the art that other styles and configurations of the invention can be easily incorporated into the teachings of the present disclosure and only one particular configuration has been shown and described for purposes of clarity and disclosure and not by way of limitation of scope.

In accordance with the invention, the preferred embodiment can be utilized by the user in a simple and effortless manner with little or no training. After initial purchase or acquisition of the apparatus 10, it is installed and utilized as indicated in FIGS. 1 through 6.

The method of installing and utilizing the apparatus 10 can be achieved by performing a series of steps. It can be appreciated that the steps described can be performed in alternative order and as such should not be viewed as a limiting factor. Acquiring the apparatus 10. Installing the base clamps 30 upon the horizontal surface 13 by inserting fasteners 33 within each base aperture 32 and into the horizontal surface 13. Installing the flange 41 onto the vertical surface 14, that is equidistantly positioned between each base clamp 30, by inserting fasteners 33 within each flange fastening apertures 43. Inserting the arm 46 into the flange receiving opening 44 and aligning the flange receiving opening apertures 45 with the arm apertures 47 and inserting the detent pin 51. Engaging the lower horizontal member 25 upon the transportable member 20 within each base clamp 30. Engaging the vertical member 27 with the arm clamp 48. Inserting the rod butt 12 within a selected receiving aperture 26. Engaging the upper portion of the fishing rod 11 within the receiving slit 24 of the respective upper aperture 22. Repeating as needed for additional fishing rods 11. Utilizing the securing cord 61 to secure the fishing rod 11 by wrapping the securing cord 61 around the fishing rid 11 and respective securing pin 60 and securing with the hooks 62. Enabling the user to easily store and transport multiple fishing rods 11 in a manner which is quick, easy, and effective.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A transportable fishing pole holder comprising:
   an "I"-shaped frame member comprising a plurality of spaced apart upper apertures and a plurality of spaced apart receiving apertures disposed below and aligned with said upper apertures adapted for holding a plurality of fishing poles parallel to one other in a vertically side-by-side orientation; further comprising:
   a vertical member having an upper end and a lower end;
   a lower horizontal member affixed to said vertical member lower end; and,
   an upper horizontal member affixed to said vertical member upper end parallel to said lower horizontal member;
   a plurality of outwardly protruding securing pins spaced apart at intervals along a rear surface alternatingly positioned relative to said upper apertures;
   wherein said plurality of upper apertures is disposed longitudinally along a front surface of said upper horizontal member, each of said upper apertures is adapted to receive a rod segment of a fishing pole; and,
   wherein said plurality of receiving apertures is disposed longitudinally along a top surface of said lower horizontal member, each of said receiving apertures is adapted to receive a butt grip end of said fishing pole;
   a plurality of base clamps fastenable to a horizontal support surface for connecting to said frame member;
   a center brace fastenable to a vertical support surface for connecting to said frame member; and,
   a pair of securing cords, each of said cords comprises a length of cord and hook fastener at each end attachable to said upper horizontal member adapted for retaining fishing poles within said upper apertures;
   wherein said hook fasteners of each securing cord are attachable between an outside pair of securing pins and said length of cord adapted to be looped between said fishing poles and an interior plurality of securing pins.

2. The apparatus of claim 1, wherein said plurality of upper apertures further comprise an interior foam core; wherein an area of said foam core is exposed within each of said upper apertures and further comprises a vertical slit adapted for holding a rod segment of said fishing pole.

3. The apparatus of claim 1, wherein said center brace further comprises:
   a flange fastenable to said vertical support surface;
   an arm removably connected to said flange; and,
   an arm clamp affixed to an end of said arm for connecting to middle portion of said frame member.

4. The apparatus of claim 3, wherein said flange further comprises:
   a flange base comprising a plurality of flange fastening apertures for fastening said flange to said vertical support surface by a plurality of fasteners; and,
   a flange receiving opening disposed in said flange base for receiving an end of said arm opposite said arm clamp.

5. The apparatus of claim 1, wherein said base clamp further comprises:
   a base comprising a plurality of base apertures for fastening said base clamp to said horizontal support surface by a plurality of fasteners; and,
   a pair of arcuate clamp arms extending from said base defining a receiving space for retaining a lower end of said frame member.

6. A transportable fishing pole holder comprising:
   a vertical member having an upper end and a lower end;
   a lower horizontal member affixed to said vertical member lower end;
   an upper horizontal member affixed to said vertical member upper end parallel to said lower horizontal member;
   a plurality of base clamps fastenable to a horizontal support surface for connecting to said lower horizontal member;
   a center brace fastenable to a vertical support surface for connecting to said vertical member;
   a plurality of receiving apertures disposed longitudinally along a top surface of said lower horizontal member, each of said receiving apertures is adapted to receive a butt grip end of a fishing pole;
   a plurality of upper apertures disposed longitudinally along a front surface of said upper horizontal member, each of said upper apertures is adapted to receive a rod segment of said fishing pole;
   a pair of securing cords, each of said cords comprises a length of cord and hook fastener at each end attachable to said upper horizontal member adapted for retaining a plurality of fishing poles within said upper apertures;
   wherein said upper horizontal member further comprises a plurality of outwardly protruding securing pins spaced apart at intervals along a rear surface alternatingly positioned relative to said upper apertures;
   wherein said plurality of receiving apertures and upper apertures are spaced apart at intervals adapted for holding said fishing poles parallel to one other in a side-by-side orientation extending between said lower horizontal member and said upper horizontal member; and,
   wherein said hook fasteners of each securing cord are attachable between an outside pair of securing pins and said length of cord is adapted to be looped between said fishing poles and an interior plurality of securing pins.

7. The apparatus of claim 6, wherein said upper horizontal member further comprises a foam core; wherein an area of said foam core is exposed within each of said upper apertures and further comprises a vertical slit adapted for holding said rod segment of said fishing pole.

8. The apparatus of claim 6, wherein said center brace further comprises:
   a flange fastenable to said vertical support surface;
   an arm removably connected to said flange; and,
   an arm clamp affixed to an end of said arm for connecting to said vertical member.

9. The apparatus of claim 8, wherein said base clamp further comprises:
   a base comprising a plurality of base apertures for fastening said base clamp to said horizontal support surface by a plurality of fasteners; and,
   a pair of arcuate clamp arms extending from said base defining a receiving space for retaining said lower horizontal member.

10. The apparatus of claim 9, wherein said flange further comprises:
    a flange base comprising a plurality of flange fastening apertures for fastening said flange to said vertical support surface by a plurality of fasteners; and,
    a flange receiving opening disposed in said flange base for receiving an end of said arm opposite said arm clamp.

11. The apparatus of claim 10, wherein said arm is attached to said flange by an insertably connected detent pin.

12. The apparatus of claim 7, wherein said center brace further comprises:
    a flange fastenable to said vertical support surface;
    an arm removably connected to said flange; and,
    an arm clamp affixed to an end of said arm for connecting to said vertical member.

13. The apparatus of claim 12, wherein said base clamp further comprises:
    a base comprising a plurality of base apertures for fastening said base clamp to said horizontal support surface by a plurality of fasteners; and,
    a pair of arcuate clamp arms extending from said base defining a receiving space for retaining said lower horizontal member.

14. The apparatus of claim 12, wherein said flange further comprises:
    a flange base comprising a plurality of flange fastening apertures for fastening said flange to said vertical support surface by a plurality of fasteners; and,
    a flange receiving opening disposed in said flange base for receiving an end of said arm opposite said arm clamp.

15. The apparatus of claim 14, wherein said arm is attached to said flange by an insertably connected detent pin.

* * * * *